Figure 1:
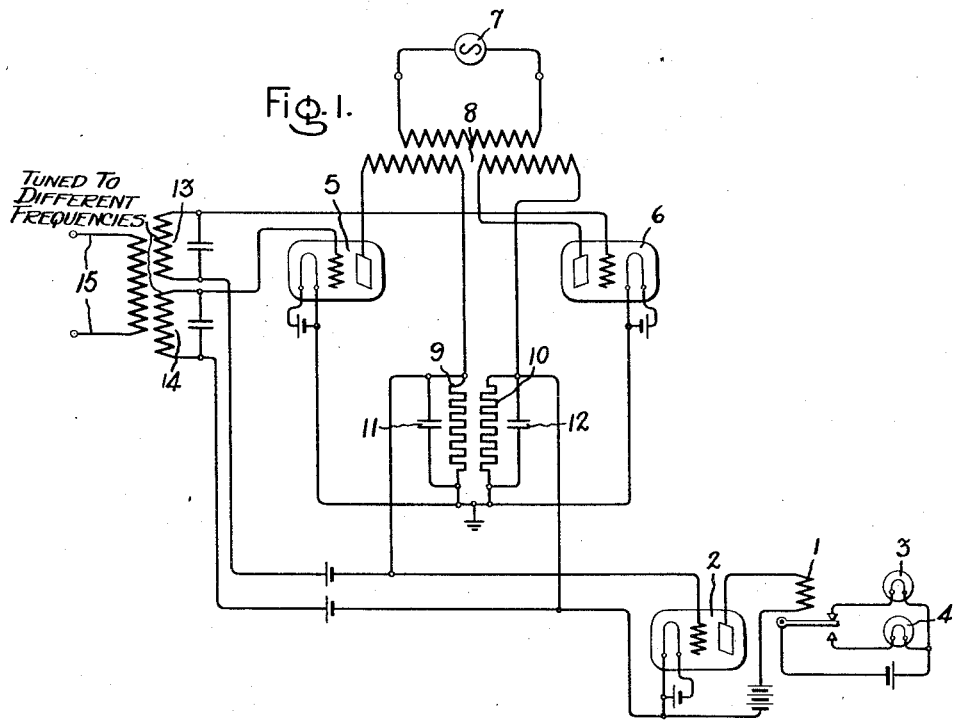

Aug. 7, 1934.        M. E. BIVENS        1,969,498
CONTROL SYSTEM
Filed June 27, 1928        2 Sheets-Sheet 1

Inventor:
Maurice E. Bivens,
by Charles E. Tullar
His Attorney.

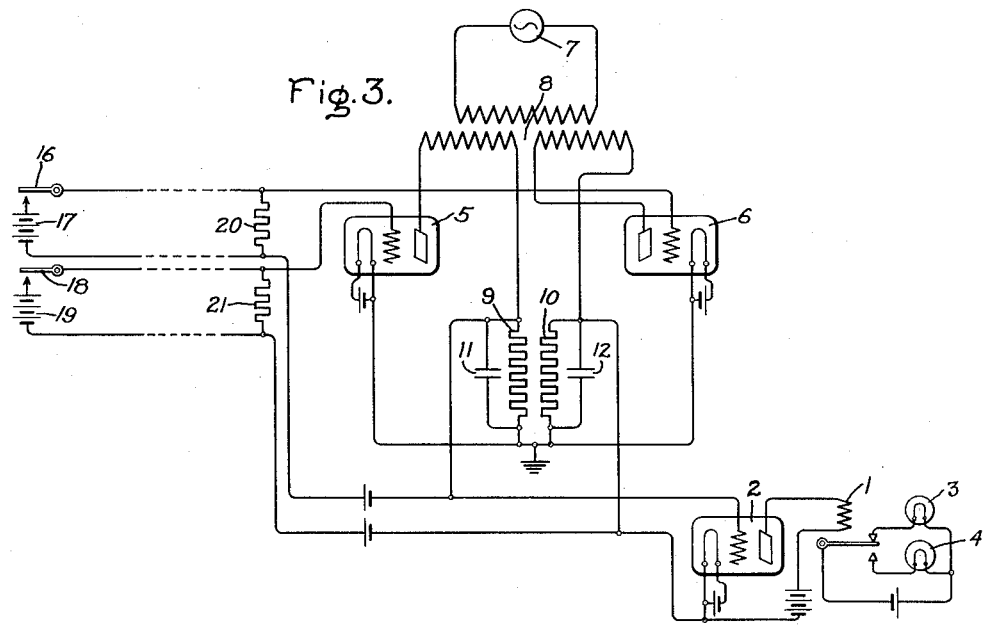
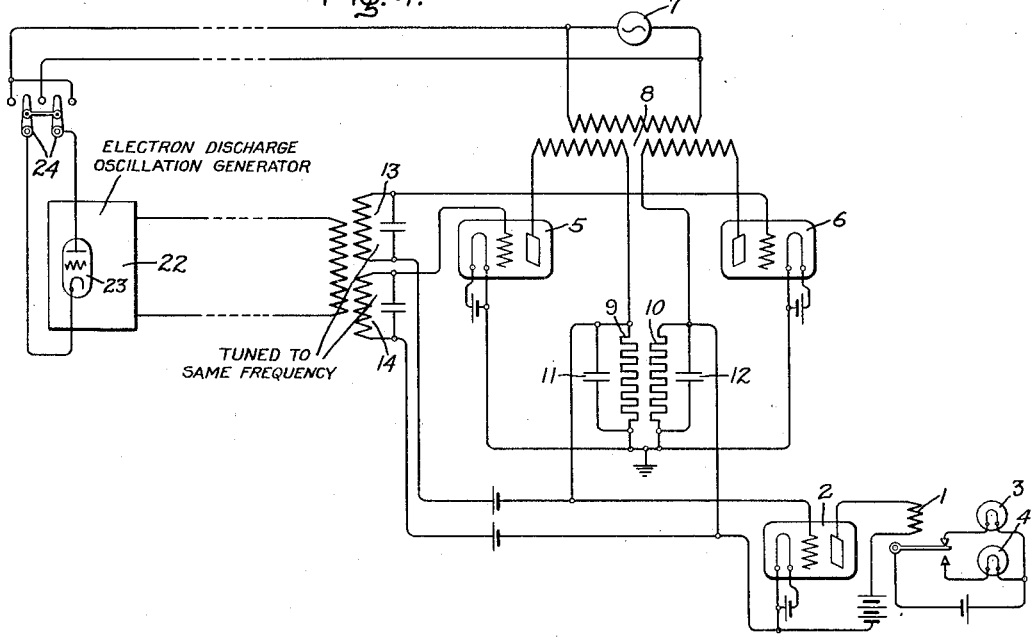

Patented Aug. 7, 1934

1,969,498

UNITED STATES PATENT OFFICE 1,969,498

CONTROL SYSTEM

Maurice E. Bivens, Scotia, N. Y., assignor to General Electric Company, a corporation of New York Application June 27, 1928, Serial No. 288,776

17 Claims. (Cl. 175—320)

My invention relates to control systems and more particularly to a method and means for use in connection with remote control of signaling and power functions.

My invention has for its purpose to provide a method of selectively operating a remote control device in response to control current of a predetermined character, or more particularly in response to current of desired frequency and to provide means which are entirely electrical whereby the result indicated may be effected.

In accordance with my invention I have provided a system of the type indicated whereby a remote device may be operated, as desired, in response to currents of predetermined frequency, the device being characterized by the absence of moving contacts, mechanical elements, pendulums, mechanical resonance devices and the like.

The system, according to my invention, comprises in its nature an electrical position relay i. e. it comprises a remote device such as a simple relay and electrical means whereby the remote device may be actuated to different positions, as desired, to effect desired circuit connections, or other control operations, in response to control current impulses of desired character, as of predetermined frequency. Having been actuated to a certain position in response to a current impulse of predetermined character, it will remain in this position until an impulse of a different predetermined character is applied to the system. Thus the necessity for continuously supplying current of the predetermined character to retain the remote device in its actuated position, is obviated, a single current impulse being sufficient to actuate the device.

In the form of the invention to be presently described the system comprises a plurality of discharge paths or electron discharge devices, of which two are shown, each of which is adapted, by means of tuned circuits, to respond to current of a predetermined frequency to produce an increase of current in the discharge path and at the same time to so affect the other path that a diminution of current in that path results. The difference in magnitude of currents flowing in the different paths, or difference in polarity of potential, which may be made to result therefrom in the manner to be indicated, may be utilized to control the operation of the remote device. Energy storage means may be utilized to retain the difference in current values or change in polarity, until a subsequent impulse of different frequency is supplied.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 represents one embodiment of my invention and Figs. 2, 3, and 4 represent modifications thereof.

Figure 2:
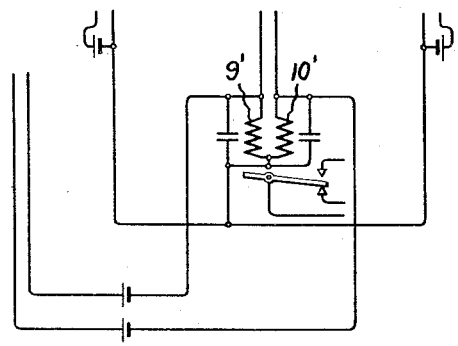

Referring to Fig. 1 of the drawings, 1 represents a device which is to be selectively controlled, this device being represented as a simple form of relay connected in the anode circuit of an electron discharge device 2 and arranged to control signal devices 3 and 4, in the form of lamps. For the purpose of selectively controlling the control device 1, which is of course responsive to the potential on the grid of device 2, a pair of electron discharge devices 5 and 6 of any suitable well-known construction, are provided. The anode circuits of these discharge devices are energized from a suitable source of alternating current potential 7 through a transformer 8, the anodes of the two devices being connected to the secondary winding of the transformer 8 in a manner such that the anodes of the two devices are at positive potential with respect to the cathodes during the same half cycle of the alternating current wave. The cathodes of these devices are connected together. Connected in the anode circuits of the discharge devices 5 and 6 are resistances 9 and 10 respectively. Connected in shunt with the resistances 9 and 10 are energy storage devices, or condensers 11 and 12 respectively. The grids of the discharge devices 5 and 6 are connected through tuned circuits 13 and 14 respectively to a suitable point upon the resistances 9 and 10, each grid being connected to the resistance which is connected in the anode circuit of the other discharge device. The cathode of the discharge device 2 is connected to a suitable point upon the resistance 10 and the grid of the device 2 is similarly connected to the resistance 9. The inductance coil of each of the tuned circuits 13 and 14 is associated through a suitable transformer with a circuit 15 extending to a remote point or to a suitable radio receiving system.

As thus arranged the operation of my device is as follows: Assuming, first, that the circuits of the discharge devices are energized and that no signaling potential is impressed upon either of the tuned circuits 13 and 14, current will flow in the anode circuit of each of the devices and a certain potential will appear upon each of the resistances 9 and 10 and the condensers 11 and 12 will assume a certain charge. Due to an inequality in the condensers 11 and 12, as for example, due to the condenser 12 being smaller than that of the condenser 11, or, if desired, due to resistance 10 being of greater magnitude than resistance 9, the condenser 12 will be charged more rapidly than the condenser 11, with the result that a potential will build up on this condenser and resistance more rapidly than upon the condenser and resistance 11 and 9. Consequently the grid of the device 5 will become more negative than that of the device 6 and accordingly the current flowing in resistance 9 will be reduced whereas that flowing in the resistance 10 will increase until a certain value determined by the constants of the circuit and characteristics of the device has been reached. Under the assumed condition it will be seen that the grid of the device 2 will be positive with respect to the cathode due to the unequal potentials on resistances 9 and 10. Current will then flow in the anode circuit of the device 2 and the relay 1 will be energized. This condition will represent the normal condition which the apparatus assumes, by virtue of its own constants, after the discharge devices have been energized and before any signal or control current has been applied.

Assume now that current is received from a remote point through the circuit 15, which is in inductive relation with the tuned circuits 13 and 14, this current being of the frequency to which the circuit 14 is tuned to respond. This circuit is connected between the grid and cathode of device 5. Since the grid of device 5 has a strong negative potential impressed upon it, the device operates as a detector and an increase in plate current is produced. The discharge device 6, for the reason that the circuit 13 is tuned to a different frequency from that assumed to have been received, and for the further reason that the potential on the grid of this device is more positive than that upon the device 5, will not so efficiently operate as a detector and accordingly will not respond to received currents. Upon an increase in current in the resistance 9 the grid of the discharge device 6 will become more negative, thereby causing a diminution in the current flowing in the device 6, and hence in the resistance 10, with the result that a greater potential will appear upon the resistance 9 than appears upon the resistance 10. Accordingly the potential upon the grid of the device 2 will become negative with respect to the cathode and the control device 1 will be deenergized, thereby causing the energization of the signal device 4.

The energy storage devices 11 and 12 are of such capacity and the resistances 9 and 10 are of such magnitude that the potential upon the grid of the discharge devices 5 and 6 are maintained during the period when the anodes are at negative potential with respect to the cathodes with the result that the potential upon the grid of the discharge device 2 with respect to the cathode maintains its polarity notwithstanding that the supply of control current is interrupted. Thus an impulse of current having the frequency to which the circuit 14 is adapted to respond will reverse the polarity of the potential upon the grid of the discharge device 2 and cause operation of the relay 1. The armature of relay 1 will then remain in the position to which it has been operated until a subsequent impulse of different frequency is received.

If we assume now that current is received having a frequency to which the circuit 13 is tuned to respond the device 6 having a strong negative potential impressed upon it operates to rectify the received waves and to produce an increase in current in the resistance 10. This increase in current causes an increase in the negative potential on the grid of the discharge device 5 and a diminution of the negative potential upon the grid of device 6 with the result that the potential upon the grid of the device 2 will reverse in polarity, the polarity of this potential being maintained by the energy storage device 12, when the control current is no longer received.

Thus it will be seen that the polarity of the potential upon the grid of the device 2 is reversed in response to each impulse of current received from a remote point, which is of a frequency different from that which was last previously received and to which one of the tuned circuits is adapted to respond.

The form of the invention shown in Fig. 2 differs from that shown in Fig. 1 in that the resistances 9 and 10 are replaced respectively by the two windings 9' and 10' of a two winding two position differential relay. It will be apaprent that the armature of this relay will be controlled in response to the frequency of current supplied to the circuits 13 and 14 in the same manner in which the armature of the relay 1 of Fig. 1 is controlled.

While I have disclosed my invention particularly as a frequency responsive device I do not wish to be limited thereto since it will be apparent that other means for controlling the grids may be employed as well. Since, as above described, the action of devices 5 and 6 is in the nature of a trigger action an impulse of direct current potential supplied to the grids will also cause the actuation of the relay 1, or 9', 10'. This modification of my invention is shown in Fig. 3 which is similar to Fig. 1 except that means are shown whereby a unidirectional potential impulse may be supplied to the grid of either of the discharge devices to cause an increase in anode current therein. This means may comprise the keys 16 and 18, which may be momentarily closed, and the associated sources of potential 17 and 19 respectively, connected as shown. The conductive path between the grid and cathdoe of the discharge devices which in Fig. 1 is maintained through the secondary windings 13 and 14 are in this case maintained by impedances 20 and 21.

My invention may be further modified by connecting the anodes of the discharge devices 5 and 6 for energization in opposite phase relation, rather than in like phase relation, in which case the selective operation may be effected by control current of a single frequency both of the circuits 13 and 14 being tuned to this frequency and the control current being supplied to each device during the half cycle in which its anode is positive as by means of an oscillator having its anode circuit energized from the source 7, with switching means for reversing the phase relation. The relay 1 will then follow the operation of the reversing switch. Such means are fully shown and described in copending application Serial No. 4781 of Austin V. Eastman, Remote control systems, filed January 26, 1925. This latter modification of my invention is illustrated in Fig. 4 of the drawings in which the connections to the right hand secondary winding of transformer 8 is shown reversed with respect to Fig. 1, thereby to indicate that the anodes of the two discharge devices are positive during opposite half cycles of the alternating electromotive force supplied by source 7. When so arranged the circuits 13 and 14 may be tuned to the same frequency and connected to receive oscillations from a single electron discharge oscillation generator 22. For purposes of simplicity of the drawings only the anode circuit of the discharge device 23 of this oscillation generator is shown. The anode and cathode of this discharge device are connected through a double throw switch 24 to the same power source 7 as that which supplies the anode circuits of devices 5 and 6. When switch 24 is in its left hand position for example, discharge device 23 is operative to generate oscillations during the half cycle when one or the other of devices 5 and 6 is operative. The corresponding device 5, or 6, then passes current and causes operation of relay 1 to one of its two positions. When switch 24 is in the opposite position device 23 is operative during the opposite half cycle and thereby causes the other one of the two devices 5 and 6 to pass current. Relay 1 is then operated to the opposite one of its two positions. Other obvious modifications of the device disclosed will appear to those skilled in the art.

While I have shown particular embodiments of my invention it will be understood that I do not wish to be limited thereto since many modifications, both in the circuit arrangement and in the instrumentalities employed may be made without departing from the spirit and scope of my invention as set forth in the appended claims.

What I claim as new and desire to secure by Letters Patent of the United States, is,—

1. In combination, a control device, means including a plurality of discharge devices for selectively controlling the energization of said control device in response to current of different frequencies each of said devices having a rectifying characteristic, means responsive to each discharge device for controlling said rectifying characteristic of another of said discharge devices, and means for maintaining said control device in the condition to which it is actuated in response to current of either frequency until current of the other frequency is received.

2. In combination, a control device, means including a plurality of discharge devices for controlling the operation of said control device, means for supplying a control impulse to either discharge device thereby to cause an increase in current flowing therein, means for causing an increase in current in each discharge device to cause a reduction in current in another discharge device and means to maintain said devices in the condition last described after said impulse has terminated.

3. In combination, an electron discharge device, a control device connected in the anode circuit of said discharge device, means including a plurality of additional discharge devices for controlling said first discharge device, means for independently controlling each of said additional discharge devices, and means including an interconnection between said additional discharge devices, whereby when any one of said additional discharge devices is actuated it remains actuated until another of said additional devices is actuated.

4. In combination, a pair of discharge devices, each of said discharge devices being connected to respond to alternating current, means operable independently of said alternating current for controlling the current in each device in response to current in the other device, a device to be controlled connected to respond to the difference in current in said devices, and means to maintain the difference in current to which said device to be controlled responds after said alternating current is interrupted.

5. In combination, a pair of electron discharge devices, each of said devices having an anode, a cathode and a grid, means for supplying control current to the grid of each device, means for supplying a bias potential on the grid of each device, said bias potential being variable in response to the unidirectional anode current of the other device, means connected to respond to the anode currents of said devices, and means effective after interruption of the control current supplied to either of said discharge devices to maintain said discharge devices in substantially the condition to which they are actuated by the supplied control current.

6. In combination, a pair of electron discharge devices, each of said devices having an anode, a cathode and a grid, means for supplying alternating current to the grid of each device, means responsive to an increase in current in each device for diminishing the current flowing in the other device, a differential relay connected to respond to the anode current in said devices, and means effective after the alternating current supplied to the grid of either of said devices is interrupted to maintain said devices substantially in the condition to which they are actuated by said alternating current.

7. In a control system, a control device, means for selectively operating said device in response to currents of different frequencies comprising a pair of electron discharge devices, each of said devices having a tuned input circuit, and each circuit being tuned to a different frequency, means for supplying current received from a remote point to said circuits, a resistance connected in the anode circuit of each device each of said resistances being included in the input circuit of the opposite device whereby the current in each device is controlled in response to the potential of the resistance connected in the anode circuit of the other device, said control device being operated by the current in said resistances.

8. In a control system, a control device, means for selectively operating said device in response to currents of different frequencies comprising a pair of electron discharge devices, each of said devices having a tuned input circuit, and each circuit being tuned to a different frequency, means for supplying current received from a remote point to said circuits, a resistance connected in the anode circuit of each device, means for controlling the current in each device in response to the potential of the resistance connected in the circuit of the other device, an additional discharge device having an anode, a cathode and a grid, said cathode being connected to one of said resistances and the grid being connected to the other resistance said control device being connected in the anode circuit of said additional electron discharge device.

9. In combination, a control device, electrical means for selectively controlling the operation of said device in response to currents of different frequencies, said means comprising a pair of electrical devices, each electrical device being connected to supply current to affect the control device in response to control current of a certain frequency, means for diminishing the current supplied by each device in response to current supplied by the other device, means to maintain said diminished current in either device after the control current supplied to the other device is removed.

10. In combination, a control device, means for selectively operating said device in response to currents of different frequencies, comprising a pair of electron discharge devices, each device being connected to respond to current of a different frequency, means for supplying alternating current potential to the anode of each device, an impedance connected in the anode circuit of each device, energy storage means connected in shunt with each impedance and means for controlling the current in each device in response to the potential on the impedance of the circuit of the other device, said control device being responsive to the current in said impedances.

11. In combination, a plurality of discharge paths, a control device, means for controlling the operation of said control device in response to current in one of said paths, means for controlling the current in said last mentioned path in response to the difference between currents in additional paths, and means for controlling each of said additional paths in response to current in another of said additional paths.

12. The combination, in a selective control system, a plurality of discharge devices, a device to be selectively controlled, means for controlling said last device in response to current in one of said discharge devices, means for controlling the current in said one discharge device in response to the difference in current in the other of said discharge devices, means responsive to alternating current for controlling the current in each of said other discharge devices, and means for controlling the current in each of said other discharge devices by current in another of said other discharge devices, said means being effective after interruption of said alternating current to maintain all of said devices in the condition to which they are actuated by the alternating current previously supplied.

13. In combination, a pair of electron discharge devices, each of said devices having an anode circuit, a cathode and a grid, means for supplying a control impulse to the grid of each of said discharge devices, means responsive to current in the anode circuit of each device for reducing the current flowing in the other device and simultaneously producing a bias upon the grid of the device to which said impulse is supplied sufficient to maintain said current after said impulse is terminated.

14. In combination, a pair of electron discharge devices, each of said devices having an anode circuit, means for causing an increase in current in the anode circuit of either of said discharge devices, and means responsive to said current increase in either device for so controlling the discharge device in which said increase occurred as to maintain said current, said means including means for simultaneously reducing the current in the other device.

15. In combination, a pair of electron discharge devices, each of said discharge devices having an anode circuit including impedance, a cathode and a grid, means for supplying control electromotive force to each of said grids, a connection between said cathodes and a conductive connection between the anode of each device and the grid of the other device, whereby when an increase in current occurs in either discharge device the grid of the other device is so controlled as to cumulatively effect the current in the anode circuit in which said increase occurred.

16. The combination, in a remote control system, of an electron discharge device having an anode circuit, a device to be controlled, said device being connected to respond to the current in said anode circuit, means for supplying a control impulse to said discharge device thereby to vary the current flowing in said anode circuit and means for automatically preventing said current from resuming its initial value after said impulse is terminated, said means being operable for an indefinite period after termination of said impulse.

17. In combination, a plurality of electron discharge devices, each of said devices having an anode and a cathode, a source of alternating energizing current connected between the cathode and anode of each device, means for supplying control current to either device to cause an increase in current therein, means responsive to said increase in current in either device to reduce the current flowing in the other device, and means to maintain said discharge devices in the condition to which they are actuated by control current supplied to either device after said control current is interrupted and until control current is supplied to the opposite device.

MAURICE E. BIVENS.